March 10, 1959  B. T. HENSGEN ET AL  2,877,118
CONTINUOUS SAUSAGE MANUFACTURE AND APPARATUS THEREFOR
Filed Sept. 23, 1953  3 Sheets-Sheet 3

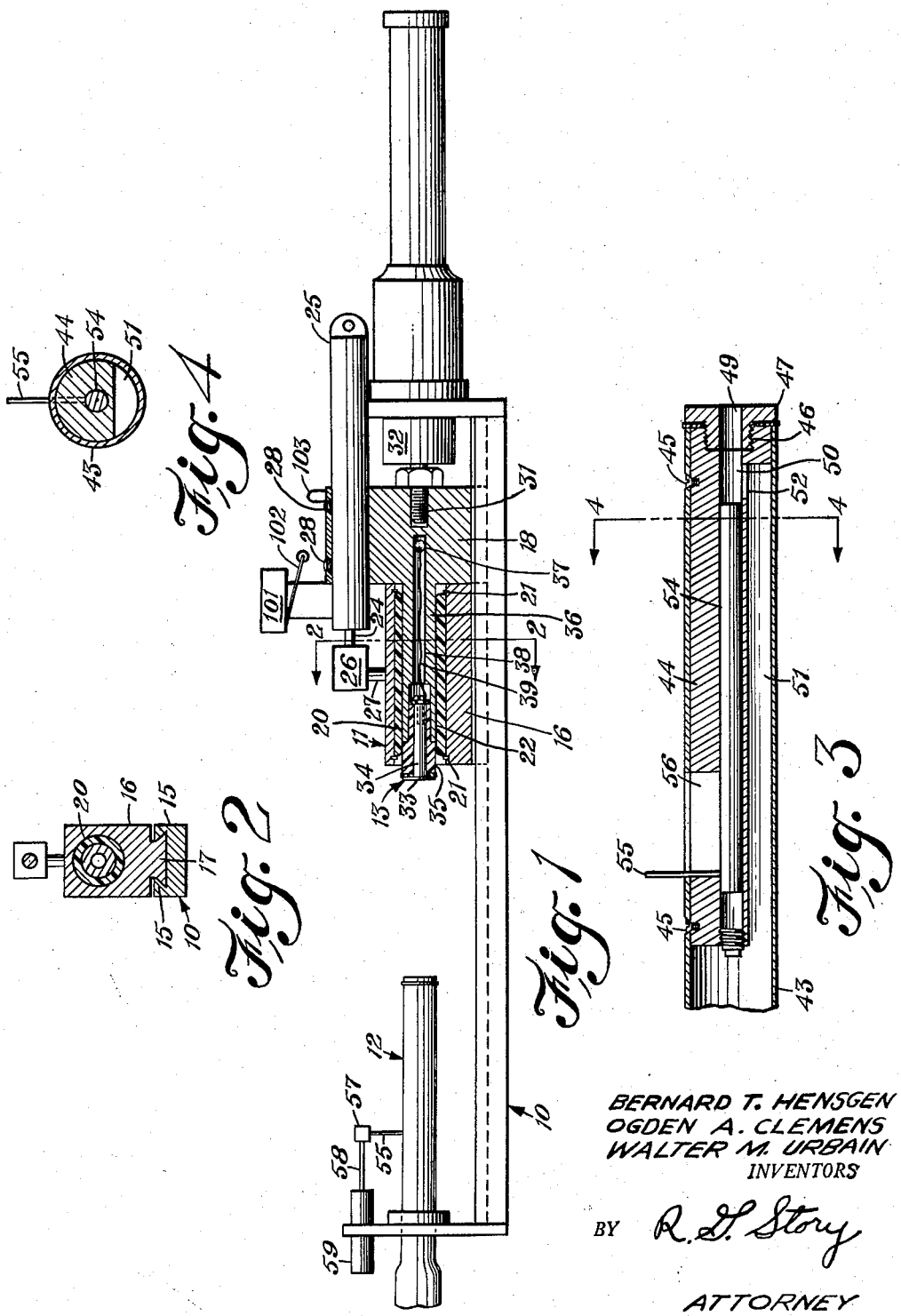

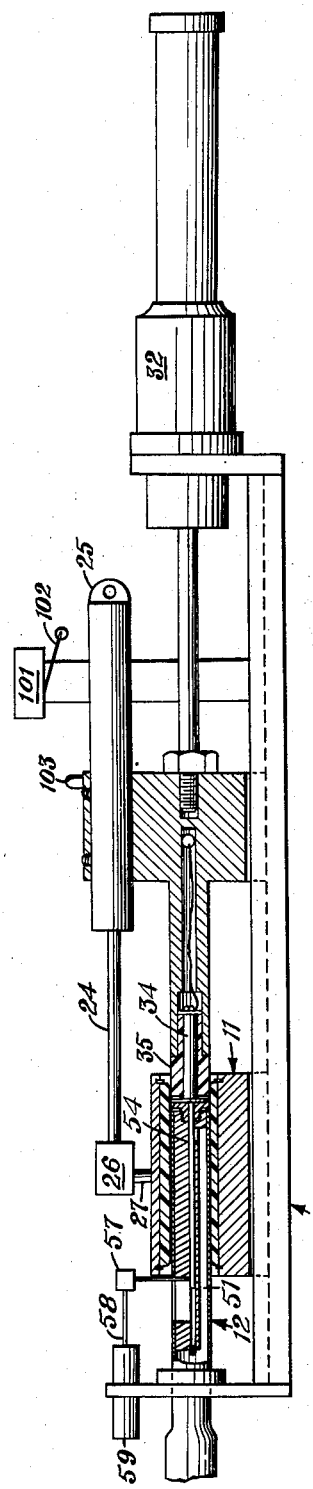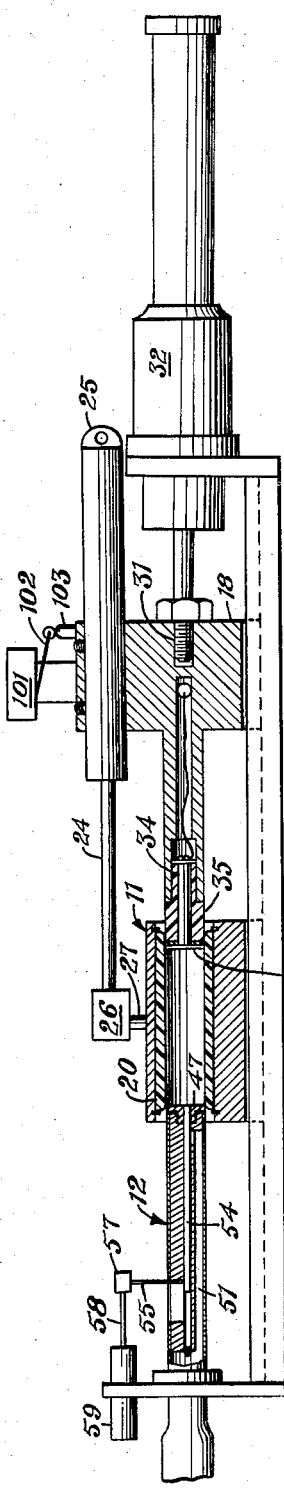

BERNARD T. HENSGEN
OGDEN A. CLEMENS
WALTER M. URBAIN
INVENTORS

BY R. G. Story

ATTORNEY

United States Patent Office 2,877,118
Patented Mar. 10, 1959

2,877,118

CONTINUOUS SAUSAGE MANUFACTURE AND APPARATUS THEREFOR

Bernard T. Hensgen and Ogden A. Clemens, Chicago, and Walter M. Urbain, Western Springs, Ill., assignors to Swift & Company, Chicago, Ill., a corporation of Illinois Application September 23, 1953, Serial No. 381,956

17 Claims. (Cl. 99—109)

The present invention relates to a method and apparatus for use in the manufacture of sausage or the like.

The traditional procedures for the manufacture of sausages have been to stuff a casing with the comminuted meat containing mixture, to form the filled casing into a plurality of links of sausage, and to cook and smoke the links. This process, of course, varies somewhat depending upon the particular product being prepared. From time to time there have been proposals for eliminating the casing during the processing and to employ a permanent or semi-permanent mold, but so far as is known these practices have not come into general use. It appears that at least one of the reasons for the lack of acceptance of such previous devices is that the finished product obtained bore little resemblance to the conventional sausages with which the public were acquainted. A further difficulty with these prior proposals undoubtedly was the large number of molds that would have to be employed to obtain any substantial volume of product and the capital investment required to supply those molds.

Recently a method and apparatus has been invented for "setting up" the comminuted frankfurter mix by employing high frequency electronic heating. After the mix has been set up into the form of a sausage the product may be handled without the aid of any molds, etc., for the cooking and smoking necessary to produce a product resembling a conventional sausage. This new development is illustrated and described in U. S. Patent No. 2,623,451.

We have devised a method and apparatus by which it is not necessary to use high frequency electronic heating while at the same time retaining the ability to quickly "set up" the comminuted product in a mold from which it may be removed for the time consuming cooking and smoking processes. Substantial advantages are obtained as a result of the ability of this invention to employ low frequency electric power. Perhaps the most significant of these advantages is the ability to use rotating generator equipment as compared to the electronic generators necessary for high frequency work. The rotating equipment has a longer life, it is sturdier, there is less maintenance and repair involved, and the maintenance and repair that is required does not necessitate the presence of highly trained technicians. While the initial cost of rotating equipment may be slightly higher than that of electronic equipment, it has a much higher efficiency and is more simple to operate, which, coupled with the advantages previously mentioned, bring the total cost substantially below that involved in the use of electronic equipment.

In addition to the ability to use rotating generating equipment, the use of lower frequencies is safer because the electrical energy can more easily be made to stay on the conductors where it belongs. The fact that the electrical energy can more easily be made to stay on the conductors simplifies the design problems involved in the apparatus for carrying out the invention. Furthermore, expensive radio frequency shielding and government certification of equipment will not be required.

A principal object of the present invention is to provide an apparatus for employing a single fixed mold in the electronic setting up of the comminuted frankfurter mix. This has the advantage that there is no destruction of materials such as accompanies the use of the casings employed in prior practices, with the accompanying cost of removal of the casings before the product is sold.

A further object of the invention is to provide a process and means that will turn out a "set up" product ready for the necessary cooking and smoking at the high rate of speed required to handle the large volume of product involved in present day operations. The machine is entirely automatic in operation and does not require constant supervision by an operator. As a result the cost of production of frankfurters is very nominal compared to conventional practices that require a substantial amount of labor in addition to the cost of casings, etc.

An additional object of the invention is to provide an apparatus that may be constructed to a great extent from standard, readily available, parts with the remaining components being of such a nature that they may be formed by simple metal working, or the like, operations. This not only makes the device nominal in first cost but greatly facilitates the maintenance and repair of the apparatus should operational failures occur. Furthermore, the apparatus is sufficiently simple so that skilled technicians are not needed to effect such maintenance and repair as may be necessary.

The apparatus that we have developed is eminently suited for use with other devices that carry out the smoking and complete the cooking of the set up product, the space occupied is very small, and the device may be easily ganged for increasing the delivery to such other devices as may be used for the smoking and for completing the cooking of the set up product.

An important feature of our invention is the use of structure such that there is a disorientation of the fibers of the comminuted meat immediately before it is injected into the mold. This causes the meat to hold the shape into which it was molded after the cooking has been completed. At the same time provision is made for controlling the flow of the product at a point immediately adjacent where it is injected into the mold. This avoids the creation of back pressures which would be likely to cause dripping of unsolidified product after the mold was opened.

Another advantages of the invention is the ability to use it in the production of sausage products having configurations other than the conventional cylindrical product. The mold may be oval or even rectangular in cross section and still obtain a product having a substantial uniformity of texture throughout. If desired the ends may be flat or may be slightly convex as occurs in the case of the conventional sausages that are formed in a casing.

Other objects and advantages will become apparent from the following description taken in conjunction with the drawings in which:

Figure 1 is a plan view of an embodiment of the invention with portions thereof in section;

Figure 2 is a section taken at line 2—2 of Figure 1;

Figure 3 is a partial section on an enlarged scale of the injection nozzle of the apparatus of Figure 1 with the section being taken along the longitudinal axis of the nozzle;

Figure 4 is a section taken at line 4—4 of Figure 3;

Figure 5 is a plan view of the embodiment of Figure 1 with portions thereof in section illustrating the position of the parts just prior to the filling of the mold;

Figure 6 is a view corresponding to Figure 5 but illustrating the position of the parts upon the completion of the filling of the mold.

Figure 7:
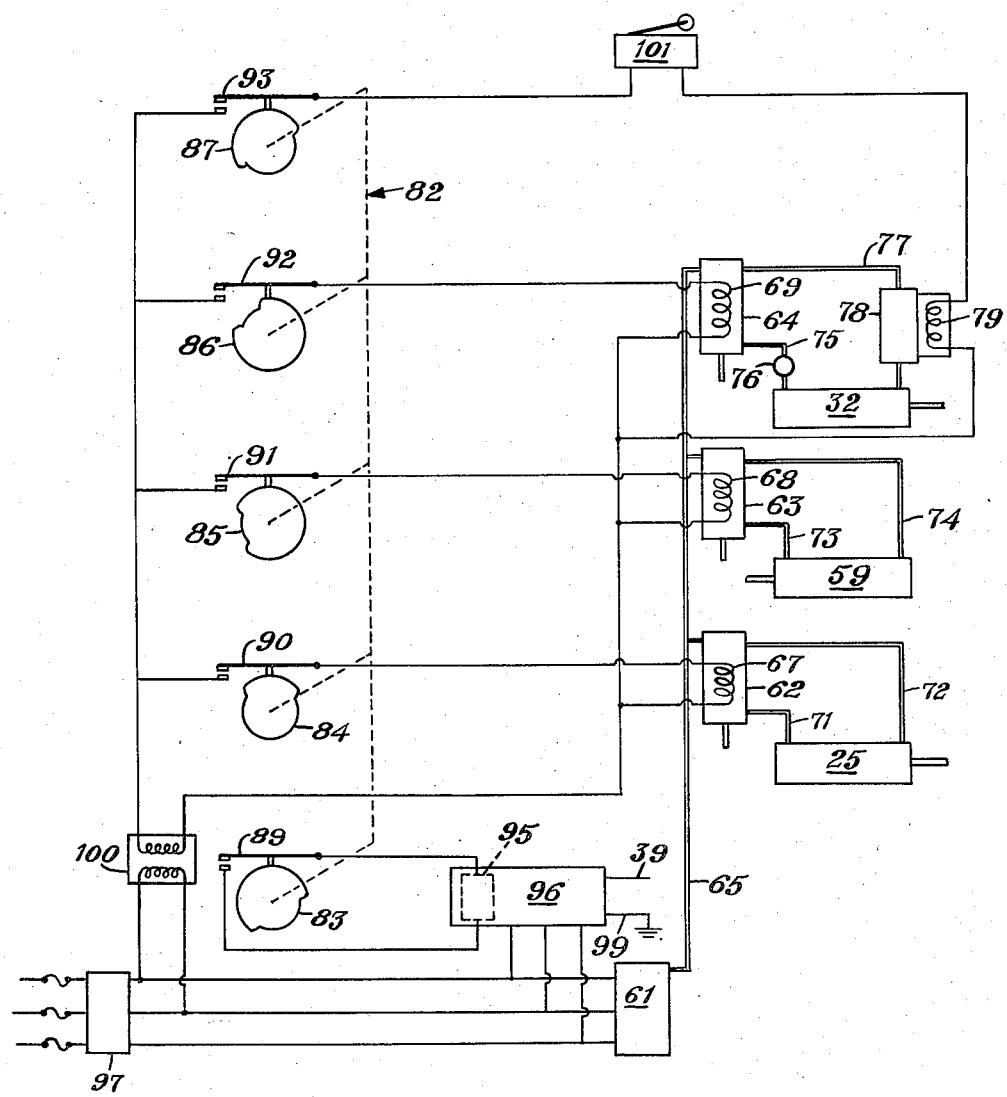
Figure 7 is a schematic diagram of the controls employed in the operation of the described embodiment of the invention.

In the conventional practices, a comminuted meat containing mixture is placed in a casing and the casing is subdivided at spaced points such as by twisting the casing or by tying strings about the casing. The comminuted mixture will contain various ingredients, such as spices, in addition to the meat. A description of the conventional practices will be found in the book "Sausage and Meat Specialties" (Part 3 of The Packers' Encyclopedia) published by The National Provisioner in 1938, the disclosure of which is included herein by reference. After the casings are stuffed and linked, the product is slowly cooked over a substantial period of time, with smoke usually being added to the cooking atmosphere during a portion of this period of time. This extended cooking has been necessary in the conventional practices to fully develop the color, flavor, and texture of the recognized product. In some instances the cooking time has been reduced but in those cases it usually has been necessary to color the casing to give the sausage an appearance more nearly resembling that of the recognized product.

In the present invention the comminuted mixture is first molded into the desired shape. In order that the product will retain its shape after cooking and to render it less frangible the fibers of the comminuted mixture are disoriented before it is molded. We prefer to carry out the molding by starting with a defined space of very small volume and first filling that space. The limits of that space are then gradually increased while at the same time adding additional material to that previously added so as to always keep the defined space full of product. This produces a dense product free of voids. This process is contained until the limits of the space corresponds to the desired size and shape of the sausage.

While holding the comminuted mixture in this shape, it is inserted in an electrical circuit in series with a source of electrical energy and an electrical current is passed through the comminuted product. The comminuted mass represents a moderate electrical resistance in this circuit and the flow of current through this resistance results in the generation of heat substantially simultaneously throughout all portions of this mass of product. Preferably the molding is performed in such a manner as to prevent any heat loss from the exterior portions of the product by conduction or radiation. Sufficient heat is generated to raise the temperature of the product very rapidly from either its refrigerated or room temperature to about 130 degrees Fahrenheit. This coagulates the protein in the meat to "set up" the comminuted mixture so that it will retain its shape when the restraining effect of the mold is removed.

The exact length of time required to coagulate the protein will depend upon several factors, as for example, the temperature of the product at the time the current flow is started, and the power applied by the source of electrical energy to the product. As previously mentioned it is possible to practice this invention by the use of low frequency alternating current. As a matter of fact the ordinary 60 cycle house current, or even direct current for that matter, may be used in the setting up of the product. However, we prefer to use alternating current of a frequency above about 1000 cycles. With frequencies substantially lower than this, electrolysis is likely to occur with the result of damaging the electrodes by which contact is made with the product and of producing unwanted flavors in the product. The lower limit of usable frequencies in a given case will depend on the components of the comminuted mixture, the electrode material, etc.

After the product has been "set up," the confinement of the comminuted mass may be removed and the product put in a "smoke house" for completing the process of cooking. This completion of the process of cooking involves continuing to raise the temperature of the product from about 130 degrees Fahrenheit at which it was at the time the confinement of the mold was removed to about 165 to 170 degrees Fahrenheit at the same rate of temperature increase as that used in the prior art in the cooking of the sausages through the same temperature range. However, it will be apparent that since the temperature of the product was brought up to 130 degrees Fahrenheit within a period of seconds, usually not more than about 20 and often as low as 2 or 3, depending upon the particular factors involved in the given operation, the total cooking time of the sausages will be greatly reduced over that of the prior art.

In the embodiment illustrated in the drawings the apparatus is mounted on a frame generally 10 and comprises a mold generally 11, an injection nozzle generally 12 which also serves as an electrode for one end of the mold, and a closure generally 13 for the other end of the mold. As is best seen in Figure 2 one side of the frame forms a pair of ways 15. Mold 11 has an external body 16, one side of which is dovetailed as shown at 17 to fit into ways 15. Closure 13 includes a supporting block 18 which is similarly dovetailed into ways 15.

Mold 11 has a longitudinal opening within which is a plastic insert 20, with the insert being held in place by expansion rings 21 which lock into grooves in the body 16. The central opening 22 of the insert 20 has a configuration corresponding to that desired for the sausage. In the illustrated embodiment it is cylindrical. Preferably a plastic is used that is a good insulator and one to which there will be little tendency for the product to adhere. A very smooth inner surface is highly desirable. We prefer to use a polymerized tetrafluoro ethylene plastic, sold under the trademark "Teflon."

The piston rod 24 of a double acting air cylinder 25 is secured to a connecting block 26 which is attached to body 16 of the mold by means of a rod 27. Air cylinder 25 passes through an opening in supporting block 18 and is secured in the opening by means of set screws 28.

Supporting block 18 is attached to the piston rod 31 of a double acting air cylinder 32 fastened in frame 10. At the opposite end of the closure 13 is a metallic electrode 33. While various conductors may be used for the electrode, a number of conductors will deteriorate over a period of time. We have found that a brass electrode having a rhodium plating thereon is eminently suited for this purpose. Electrode 33 is secured to a brass rod 34 mounted in an insulator 35. Insulator 35 is in turn fitted into a hollow cylindrical member 36 forming a part of block 18. An opening 37 is made through one side of block 18 to communicate with the central opening 38 in the cylindrical member 36 to allow an insulated wire 39 to be brought in to carry the high frequency energy to electrode 33 through rod 34.

Referring to Figure 3, the nozzle 12 is formed of a tubular body 43 having a partial insert 44 secured therein by means of screws 45. The outer end of insert 44 is threaded as illustrated at 46 for the attachment of a second electrode 47. Electrode 47 has an axial opening 49 with which is aligned an opening 50 in insert 44. The insert 44 being only partial leaves a passageway 51 along the side of the insert. Passageway 51 communicates with opening 50 by means of a cross passageway 52. A cylindrical valve rod 54 within opening 50 forms a slide valve to control the flow of the sausage mix through cross passage 52.

The nozzle structure described performs several important functions. The two right angle turns that the product must make when flowing from passage 51 through cross passage 52 and into opening 50 produces a disorientation of the fibers of the meat which causes the product to hold its shape after it is fully cooked and also causes the product to resist fracturing. This disorientation is preferably achieved immediately adjacent the end of the nozzle. If the product is caused to flow through a straight passage for a substantial distance after the disorientation is achieved, that flow will cause the product to reorientate itself along the line of the flow with the result that the finished product will shorten in the dimension parallel to the line of flow and will expand in the dimension at right angles to the line of flow. The end result of the reorientation is that the product, after it is cooked, has a shape entirely different from that into which it was molded. By having the valve immediately adjacent the end of the nozzle there is not sufficient product remaining in the passage between the valve and the end of the nozzle to cause any undesirable flow of product to from the nozzle after the mold has been opened.

Valve rod 54 is moved within opening 50 by means of a connecting rod 55 which passes through a slot 56 in insert 44 and body 43. Connecting rod 55 is secured to a block 57 mounted on the end of piston rod 58 of a double acting air cylinder 59. Air cylinder 59 is attached to frame 10 as is the tubular body 43 of nozzle 12.

Referring to Figure 7, the three air cylinders 25, 32, and 59 are each supplied by air under pressure from a suitable pump and storage tank 61 through three 4-way valves, 62, 63, and 64. Each of the valves 62 through 64 is connected to pump 61 by means of a pipe 65. Each of the valves 62 through 64 is spring loaded and the three valves are actuated by solenoids 67, 68, and 69, respectively.

Cylinder 25 is connected to valve 62 by means of pipes 71 and 72. Valve 63 is connected to cylinder 59 by means of pipes 73 and 74. One end of cylinder 32 is connected to valve 64 through a pipe 75 and a flow control valve 76. The other end of cylinder 32 is connected to valve 64 through a pipe 77 and a 2-way valve 78. Valve 78 is normally open but is closed upon the energizing of solenoid 79 thereof. The cycle of operations is controlled by a timer generally 82 which includes a series of cams 83 through 87 and a switch (89 through 93, respectively) for each of the cams.

Switch 89 of cam 83 is connected to the oscillator relay 95 of the high frequency electronic generator 96. Both the electronic generator 96 and the pump 61 are supplied with power through a main switch 97 connected to a suitable source of power. Since the power demand for both of these is somewhat high, 220 volt, 3 phase supply is used. As previously explained, wire 39 is connected to electrode 33 and to the generator 96. The other output wire 99 of the generator 96 is grounded to frame 10. From the previous description of the nozzle 12 it will have been apparent that electrode 47 is also grounded to the frame.

A step-down transformer 100 is used to reduce the supply voltage to a value corresponding with the requirements of the solenoids for the valves that are employed. Each of solenoids 67, 68 and 69 is connected to one side of transformer 100 through switches 90, 91, and 92, respectively. Solenoid 79 in addition to passing through switch 93 is also connected through a normally open, positioning switch 101. As is apparent the return side of the circuits is a common line. Switch 101 is employed to control the length of the sausages. As will be seen in Figure 1, it is mounted on frame 10, with the switch lever 102 in the path of a cam 103 attached to supporting block 18. The timer 82 rotates the cams 83 through 87 in a clockwise direction.

Preferably, provision is made for preventing the mold from depriving the product of heat during the molding operation. This may be done by suitable prewarming of the mold. The beam from one or more conventional infra red lamps may be directed on the mold to raise its temperature sufficiently to prevent any significant heat loss from the product. After the machine is in operation the heat generated in setting up the product should be sufficient to keep the mold warm.

Starting from the position illustrated in Figure 1, switch 92 first closes to energize solenoid 69 and reposition valve 64. This applies the air to cylinder 32 through pipe 75 to advance supporting block 18, and thus necessarily both the mold 11 and the closure 13, to the left in Figure 1. At the limit of the movement the two electrodes 33 and 47 are almost in contact with each other.

After cylinder 32 reaches the end of its stroke, cam 84 closes switch 90 to reposition valve 62 and advance the piston rod 24 of air cylinder 25 by the admission of air through pipe 71 and the exhaust of air through pipe 72. When the piston of cylinder 25 has reached the end of its stroke the parts are positioned as illustrated in Figure 5. The two electrodes first were brought substantially together to avoid trapping any air in the mold. We have discovered that it is important to keep the air out of the mold and out of the mix, not only to avoid visible voids in the finished product, but also to achieve a finished appearance corresponding to that of conventional sausage products.

Switch 91 then is closed by cam 85 to change valve 63, to apply air under pressure to pipe 73, and to draw in piston rod 58 of cylinder 59, resulting in the unblocking of cross passage 52 (Figure 3). The comminuted meat mixture is supplied under pressure through tube 43 from a suitable means (not shown). The mixture flows through passage 51, cross passage 52 which has been opened by the movement of valve rod 54, and into the mold through openings 50 and 49. Immediately thereafter switch 92 is opened by cam 86 allowing the spring loaded valve 64 to reposition itself and to apply air under pressure through pipe 77 to cylinder 32. The speed of the movement of piston rod 31 is controlled by the flow of exhaust air through flow control valve 76. This speed is adjusted proportionate to the rate of flow of the comminuted product through the nozzle 12 so that the product solidly fills the mold as the electrodes move apart to avoid the creation of voids.

Shortly after piston 32 starts moving the mold 11 and the closure 13 away from the nozzle, switch 93 is closed by cam 87. However, current is not supplied to solenoid 79 because switch 101 is normally open. Subsequently, the movement of supporting block 18 brings cam 103 into contact with switch lever 102 of switch 101 to actuate the switch and close the circuit through solenoid 79. This closes valve 78 to stop the flow of air to cylinder 32 and to stop the movement of supporting block 18. Thus it is the setting of cam 103 with respect to switch lever 102 that determines the length of the sausage.

Thereafter switch 91 breaks to permit valve 63 to reposition itself and move valve rod 54 to stop the flow of product through the nozzle. The high frequency generator then is started by the closing of switch 89. The length of time that the electronic generator is left on is dependent upon the power being applied, the frequency, the sausage mixture, as well as other features. Generally speaking, it will be found that a time of about 2 to 10 seconds is satisfactory. At the end of the chosen time the application of power by the electron generator is stopped by the opening of switch 89.

The molded product is removed from the mold by the opening of switch 90 and the opening of switch 93. The opening of switch 90 deenergizes solenoid 67 to allow valve 62 to reposition itself. This applies air pressure to pipe 72 to pull in the piston rod 24 and slide mold 11 back over closure 13 toward the position illustrated in Fig. 1. The opening of switch 93 breaks the circuit through solenoid 79 to allow valve 78 to open permitting piston rod 31 to continue to the end of its stroke. This moves the two electrodes 33 and 47 apart so that the product is not held between the electrodes, and after mold 11 has retracted beyond the end of electrode 33 the molded product is free to fall to a suitable conveyor (not shown) on which it is carried to the smoke house for the remaining cooking and for the smoking, if desired.

The foregoing description of a specific embodiment is for the purpose of compliance with 35 U. S. C. 112, and we do not desire to be limited to the exact details shown and described, for obvious modifications will occur to a person skilled in the art.

We claim:

1. A method of manufacturing a food product from a comminuted mixture containing meat fibers including the steps of turning said fibers to disorient the fibers of the mixture, molding the disoriented mixture to the desired shape, and heating substantially simultaneously all portions of the molded mixture at least about 2 seconds to at least partially coagulate the protein.

2. A method of manufacturing a food product from a comminuted mixture containing meat fibers including the steps of turning said fibers to disorient the fibers of the mixture, molding the disoriented mixture to the desired shape, heating substantially simultaneously all portions of the molded mixture while holding said mass in said shape at least about 2 seconds to at least partially coagulate the protein whereby the molded mass has a self-sustaining form, and slowly completing the cooking of the product.

3. The method of manufacturing a sausage from a comminuted mixture containing meat, including the steps of molding an amount of said mixture to the shape of said sausage, connecting an electrical circuit to each end of said amount and passing an alternating electric current through said amount for at least about 2 seconds to substantially simultaneously heat all portions of said amount to a temperature sufficient to at least partially coagulate the protein of said meat, disconnecting said electrical circuit from said amount, and completing the cooking of the sausage.

4. The method of manufacturing a sausage from a comminuted mixture containing meat, including the steps of molding an amount of said mixture to the shape of said sausage, connecting an electrical circuit to each end of said amount and passing an alternating electric current through said amount for at least about 2 seconds to substantially simultaneously heat all portions of said amount to a temperature sufficient to at least partially coagulate the protein of said meat, disconnecting said electrical circuit from said amount, completing the cooking of the sausage, and smoking the sausage.

5. The method of manufacturing a sausage from a comminuted mixture containing meat through the use of a sausage mold, including the steps of filling said mold with an amount of said mixture while turning the fibers of the meat to disorient the fibers, connecting the ends of said amount within the mold to an electrical circuit and passing an alternating electric current through said circuit and said amount for at least about 2 seconds to substantially simultaneously heat all portions of said amount to a temperature sufficient to at least partially coagulate the protein of the meat and to quickly produce a permanent set throughout the amount, removing said amount from the mold and completing the cooking of the sausage.

6. A device for molding a comminuted meat containing product, said device including a mold having walls defining an internal opening to receive the product, the walls of the mold forming said opening being an electrical non-conductor, an electrode positioned in each end of said mold, a mold filing nozzle adapted to be inserted within said opening, one of said electrodes being attached to an end of said nozzle, mounting means for an electrode to permit that electrode member to be moved toward and away from the other electrode, and power means to move said electrodes about together and apart within said opening.

7. A device for molding a comminuted meat containing product, said device including a mold having walls defining an internal opening to receive the product, the walls of the mold forming said opening being an electrical non-conductor, an electrode positioned in each end of said mold, a mold filling nozzle adapted to be inserted within said opening, one of said electrodes being attached to an end of said nozzle, a valve for controlling the flow of product through said nozzle, said valve being immediately adjacent said end of said nozzle, mounting means for an electrode to permit that electrode to be moved toward and away from the other electrode, and power means to move said electrodes about together within said opening, to open said valve and to move said electrodes apart.

8. A device for molding a comminuted meat containing product, said device including a mold having walls defining an internal opening to receive the product, the walls of the mold forming said opening being an electrical non-conductor, an electrode positioned in each end of said mold, a mold filling nozzle adapted to be inserted within said opening, one of said electrodes being attached to an end of said nozzle, a valve for controlling the flow of product through said nozzle, means within said nozzle to disorient said product, mounting means for an electrode to permit that electrode to be moved toward and away from the other electrode, and power means to move said electrodes about together within said opening, to open said valve and to move said electrodes apart.

9. A device for molding a comminuted meat containing product, said device including a mold having walls defining an internal opening to receive the product, the walls of the mold forming said opening being an electrical non-conductor, an electrode positioned in each end of said mold, a mold filling nozzle adapted to be inserted within said opening, one of said electrodes being attached to an end of said nozzle, said one electrode and said end of said nozzle having an opening therein for the discharge of product into the mold, a first passageway within said nozzle offset to one side of said nozzle opening, a cross passageway in said nozzle between said nozzle opening and said first passageway, and a slide valve within said nozzle opening and movable between a first position at which said passageway is obstructed and a second position at which said first passageway is in communication with said nozzle opening.

10. A device for molding a comminuted meat containing product, said device including a frame, a tubular mold having a lining of an electrical non-conductor, each end of said mold being open, mounting means for said mold for movement of the mold along a given line, a tubular filling nozzle having an electrode on one end thereof, said nozzle having the external dimensions thereof smaller than the internal dimensions of the mold and being mounted on said frame in said line in alignment with the internal opening of the mold whereby said mold will slide over said nozzle, said nozzle having an internal passageway for the product extending through said end, a valve in said passageway adjacent said end, means in said passageway adjacent said end to disorient the product passing through the passageway, a second electrode, mounting means for said second electrode for movement of the second electrode along said line in alignment with said internal opening, said second electrode mounting means being constructed to move said second electrode through said internal opening, and power means sequentially to bring said electrodes about into contact, to position said mold with one end thereof about said two electrodes, to open said valve, to move said mold and the second electrode at a common rate of speed in a direction away from the first electrode a given distance, to close said valve, to apply a high frequency electric energy to said electrodes for a predetermined period of time, and to further move said second electrode in said direction and to move said mold in said direction a greater distance in said direction to permit the molded product to fall from between the electrodes.

11. A device for molding sausages or the like, said device comprising a mold having a molding cavity therein with each end of said cavity being open, a pair of electrodes and supporting members therefor, one of said electrodes and the corresponding member being smaller in cross-sectional size than said cavity whereby said electrode may be inserted into said cavity, a first mounting means attached to one support member, a second mounting means attached to said other support member, said mounting means positioning said electrodes in alignment with each other, said first mounting means being movable, a first power means connected to said first mounting means to move the respective electrode toward and away from the other electrode, said mold being positioned with said cavity in axial alignment with said support members, and a second power means connected to said mold and to one of said mounting means to position said mold with respect to said electrodes.

12. A device for molding sausages or the like, said device comprising a mold having a molding cavity therein with each end of said cavity being open, a pair of electrodes and supporting members therefor, one of said electrodes and corresponding member being smaller in cross-sectional size than said cavity whereby said electrode may be inserted into said cavity, a first mounting means attached to one support member, a second mounting means attached to said other support member, said mounting means positioning said electrodes in alignment with each other, said first mounting means being movable, a first power means connected to said first mounting means to move the respective electrode toward and away from the other electrode, said mold being positioned with said cavity in axial alignment with said support member, a second power means connected to said mold and to one of said mounting means to position said mold with respect to said electrodes, and a control means connected to said power means to move said electrodes adjacent each other with said mold about said one electrode, to gradually move said electrodes a given distance apart with said mold remaining about said electrode, and to subsequently move said electrodes a greater distance apart and to move said mold over the support member of said one electrode with said electrode adjacent the end of said mold.

13. A device for molding sausages or the like, said device comprising a mold having a molding cavity therein with each end of said cavity being open, a pair of electrodes and supporting members therefor, each electrode and member being smaller in cross-sectional size than said cavity whereby said electrodes may be inserted into said cavity, a movable mounting means attached to one of said members and positioning said electrode in alignment with the other electrode, a first power means connected to said mounting means to move said electrode toward and away from the other electrode, said mold being slipped over said one electrode, and a second power means connected to said mounting means and with said mold to position said mold with respect to said electrodes.

14. A device for molding sausages or the like, said device comprising a mold having a molding cavity therein with each end of said cavity being open, a pair of electrodes and supporting members therefor, each electrode and member being smaller in cross-sectional size than said cavity whereby said electrodes may be inserted into said cavity, a movable mounting means attached to one of said members and positioning said electrode in alignment with the other electrode, a first power means connected to said mounting means to move said electrode toward and away from the other electrode, said mold being slipped over said one electrode, a second power means connected to said mounting means and with said mold to position said mold with respect to said electrodes, and a control means connected to said power means to move said electrodes adjacent each other with said mold about said electrodes, to gradually move said electrodes a given distance apart with said mold remaining about said electrodes, and to subsequently move said electrodes a greater distance apart and to move said mold over the support member of one electrode with said electrode adjacent the end of said mold.

15. A device for molding sausages or the like, said device comprising a mold having a molding cavity therein with each end of said cavity being open, a pair of electrodes and supporting members therefor, a first of said electrodes and the corresponding member being smaller in cross-sectional size than said cavity whereby said electrode may be inserted into said cavity, a first mounting means attached to one support member, a second mounting means attached to said other support member, said mounting means positioning said electrodes in alignment with each other, said first mounting means being movable, a first power means connected to said first mounting means to move the respective electrode toward and away from the other electrode, said mold being positioned with said cavity in axial alignment with said support members, a second power means connected to said mold and to one of said mounting means to position said mold with respect to said electrodes, one of said electrodes and the respective support member having a passageway therethrough, and material feeding means connected to said passageway to supply product to said mold.

16. A device for molding sausages or the like, said device comprising a mold having a molding cavity therein with each end of said cavity being open, a pair of electrodes and supporting members therefor, a first of said electrodes and the corresponding member being smaller in cross-sectional size than said cavity whereby said electrode may be inserted into said cavity, a first mounting means attached to one support member, a second mounting means attached to said other support member, said mounting means positioning said electrodes in alignment with each other, said first mounting means being movable, a first power means connected to said first mounting means to move the respective electrode toward and away from the other electrode, said mold being positioned with said cavity in axial alignment with said support members, a second power means connected to said mold and to one of said mounting means to position said mold with respect to said electrodes, one of said electrodes on the respective support member having a passageway therethrough, and a valve in said passageway adjacent said one electrode.

17. A device for molding sausages or the like from a comminuted meat-containing product, said device comprising a mold having a molding cavity therein with each end of said cavity being open, a pair of electrodes and supporting members therefor, a first of said electrodes and the corresponding member being smaller in cross-sectional size than said cavity whereby said electrode may be inserted into said cavity, a first mounting means attached to one support member, a second mounting means attached to said other support member, said mounting means positioning said electrodes in alignment with each other, said first mounting means being moveable, a first power means connected to said first mounting means to move the respective electrode toward and away from the other electrode, said mold being positioned with said cavity in axial alignment with said support members, a second power means connected to said mold and to one of said mounting means to position said mold with respect to said electrodes, one of said electrodes and the respective support member having a passageway therethrough, and means adjacent the electrode end of said passageway to turn the product to disorient the meat fibers of said product.

(References on following page)

References Cited in the file of this patent

UNITED STATES PATENTS

| | | |
|---|---|---|
| 1,009,953 | Boyle | Nov. 28, 1911 |
| 1,900,573 | McArthur | Mar. 7, 1933 |
| 1,930,169 | Halvorson et al. | Oct. 10, 1933 |
| 2,075,474 | Scutt | Mar. 30, 1937 |
| 2,182,211 | Paddock | Dec. 5, 1939 |
| 2,280,022 | Banigan et al. | Apr. 14, 1942 |
| 2,431,095 | Tucker | Nov. 18, 1947 |
| 2,477,258 | MacMillin | July 26, 1949 |
| 2,623,451 | Prohaska | Dec. 30, 1952 |